US007739121B2

(12) United States Patent
Jain et al.

(10) Patent No.: US 7,739,121 B2
(45) Date of Patent: Jun. 15, 2010

(54) METHOD AND APPARATUS FOR PROVIDING INTELLIGENT AND CONTROLLED ACCESS TO SUPPLY CHAIN INFORMATION

(75) Inventors: Vineet Kumar Jain, San Mateo, CA (US); Amrit Jassal, Morgan Hill, CA (US)

(73) Assignee: One Network Enterprises, Inc., Dallas, TX (US)

( * ) Notice: Subject to any disclaimer, the term of this patent is extended or adjusted under 35 U.S.C. 154(b) by 640 days.

(21) Appl. No.: 10/060,572

(22) Filed: Jan. 29, 2002

(65) Prior Publication Data

US 2003/0144858 A1    Jul. 31, 2003

(51) Int. Cl.
*G06Q 99/00* (2006.01)
(52) U.S. Cl. ...................................... 705/1.1
(58) Field of Classification Search .............. 705/1, 705/1.1
See application file for complete search history.

(56) References Cited

U.S. PATENT DOCUMENTS

| 5,953,707 | A  * | 9/1999  | Huang et al. ................. 705/10 |
| 6,157,915 | A  * | 12/2000 | Bhaskaran et al. ............. 705/7 |
| 6,578,005 | B1   | 6/2003  | Lesaint et al. |
| 7,212,976 | B2   | 5/2007  | Scheer |
| 2002/0087438 | A1 | 7/2002 | Kunieda et al. |
| 2002/0095457 | A1 * | 7/2002 | Sharma et al. ............. 709/203 |
| 2003/0018546 | A1 | 1/2003 | Ayala et al. |
| 2003/0050819 | A1 | 3/2003 | Koenigbauer et al. |
| 2003/0078846 | A1 * | 4/2003 | Burk et al. .................... 705/22 |
| 2003/0233264 | A1 | 12/2003 | Jones et al. |
| 2004/0030428 | A1 | 2/2004 | Crampton et al. |
| 2004/0128261 | A1 | 7/2004 | Olavson et al. |

(Continued)

FOREIGN PATENT DOCUMENTS

WO      WO 0227614 A1 *  4/2002

(Continued)

OTHER PUBLICATIONS

Freeman, Eva, "Supply chain: modeling makes the difference." Datamation, v43, n10, p. 64 (5), Oct. 1997.*

(Continued)

*Primary Examiner*—Jonathan Ouellette
(74) *Attorney, Agent, or Firm*—Gardere Wynne Sewell LLP; Karl L. Larson

(57) ABSTRACT

A system and method for retaining and controlling supply chain information in the form of objects and associated metadata in a database to provide intelligent and controlled access to such objects is provided. The objects may be accessed by multiple users according to predetermined rules, and may be integrated into an application by using metadata that defines such access. A system may include a server configured to monitor and to provide intelligent access to supply chain information. The system may also include a repository for storing data and algorithms related to the retention and analysis of supply chain information, which may be explicitly developed by a user, or implicitly produced by dynamically monitoring and collecting information from an associated application. The system may also include an analysis engine configured to analyze supply chain information that is monitored and collected in the repository. A recommendation module may also be included for providing recommendations for activity related to a business supply chain.

8 Claims, 10 Drawing Sheets

U.S. PATENT DOCUMENTS

2005/0209732 A1  9/2005  Audimoolam et al.

FOREIGN PATENT DOCUMENTS

| WO | WO 0235393 A1 | * | 5/2002 |
| WO | WO 0235438 A1 | * | 5/2002 |
| WO | WO 0250633 A2 | * | 6/2002 |

OTHER PUBLICATIONS

Mason-Jones, R.; Towill, D.R., "Information enrichment: designing the supply chain for competitive advantage," Supply Chain Management, v2n4, pp. 137, 1997.*

Chandrashekar, Ashok; Schary, Philip, B, "Toward the virtual supply chain: The convergence of IT and organization," International Journal of Logistics Management, v10n2, pp. 27-39, 1999.*

Desmond, John P., "Chain Reaction." Software Magazine, Sep. 1999.*

"Neoforma.com, Inc. to Acquire U.S. Lifeline, Inc.; Leader in Supply Chain Content to Extend Neoforma.com's Service Offering." Business Wire, Mar. 9, 2000.*

Motwani, Jaideep; Madan, Manu; Gunasekaran, A, "Information technology in managing global supply chains," Logistics Information Management, v13n5, pp. 320-327, 2000.*

Prasad, Sameer; Tata, Jasmine, "Information investment in supply chain management," Logistics Information Management, v13n1, pp. 33-38, 2000.*

Smith, Mark, "Business-Critical Prism: A Strategic Assessment Guide for BI Products." Intelligent Enterprise, 4, 15, 29, Oct. 4, 2001.*

U.S. Appl. No. 10/887,468 entitled, "Non-Stale Incremental Planning" filed Jul. 8, 2004; Inventor: Notani, et al., Status Pending.

U.S. Appl. No. 10/887,218 entitled, "Real-Time Planning and Execution With Minimum Perturbation" filed Jul. 8, 2004; Inventor: Notani, et al., Status Pending.

Yan, Shangyao, Tu, Yu-Ping, "Multifleet routing and multistop flight scheduling for schedule perturbation," European Journal of Operational Rsearch, 1997, vol. 103 pp. 155-169.

* cited by examiner

636 — Notes | Help

Control Station > Notifications > Create Indicator
Welcome

High (0/0)   Medium (0/0)
Supply

User ▼

Control Station
Inventory
Forecast
Orders
Supply Base
Simulations
Notifications
  Create Alert
  Create Indicator
Management
  Manage Alerts
  Manage Indicators
  Manage Scenarios
  Manage Simulations
  Change Password Setup Indicator
Type *  — 602
[Days of supply ▼]

600

Define Parameters

Display name * (maximum 30 characters)     Description  — 606
604 — [Comm Cable - 12 ▼]                  [          ]

Product families — 608                     Commodity codes — 610
[--Include All--                            [--Include All--
 BOARD                                       BOARD
 CABLE                                       CABLE
 CART]                                       CART]

Parts *  — 612                             Held for *  — 614
[40GB SWAP DRIVE ▼]                        [GN-SYS-TSC]

Time periods *  — 616
[90 days from today ▼]

Define Thresholds (618)

is less than         is greater than      is between
620 — [5] Day(s)             [8] Day(s)           [5] Day(s) and [8]
                                 — 622            624              626 shown by             shown by             shown by
          ○ [!]                ● [!]              [on/off ◇]
628       ● [✓]          630   ○ [✓]        632

Share
Share with  — 634
[--None--
        ]

FIG. 6

Notes  Help

Control Station > Notifications > Create Alert
Welcome

High (0/0)  Medium (0/0)
Supply

User ▼

Setup Alert
  Type *  ─702
  [Days of supply ▼]                                    700

Control Station
Inventory
Forecast                Define Parameters
Orders                  Display name * (maximum 30 characters)    Description  ─706
Supply Base       704─┘ [                        ▼]               [                ]
Simulations
                        Product families  ─708                    Commodity codes  ─710
Notifications           [--Include All--]                         [--Include All--]
  Create Alert          BOARD                                     BOARD
  Create Indicator      CABLE                                     CABLE
                        CART                                      CART
Management
  Manage Alerts         Parts *  ─712                              Held for *  ─714
  Manage Indicators     [--Include All--]                          [GN-SYS-TSC]
  Manage Scenarios      12X CDR DRIVE
  Manage Simulations    256MB DIMM
  Change Password       40GB SWAP DRIVE Time periods *  ─716
                        [--Please Select One-- ▼]

Define Thresholds (718)
                      ○ [Equal to ▼] [0] Day(s)  ⊙ [Between ▼] [5] Day(s) and [10]
                         720─┘                      722─┘
                                                                         ─728
                        Urgency  ─724
                        [High ▼]                              ⊙ Active   ○ Inactive ☑ Notify me by e-mail  ─726
                        [jane@company.com]

Share
                        Share with  ─730
                        [--None--]

FIG. 7

CM Management Scenario (3/3) 1000

Alert Occurrence: DOS a...

*Name:* 1004
DOS above 60 for CASE — 1006

*Description:* 1008
Trigger based on days of supply

*Type:* 1010
Days Of Supply exceeds specifie...

*Detected:* 1012
07/20/2001

*Criteria:*

---

FW: Alert from Valdero - Message (HTML) — 1002

File  Edit  View  Insert  Format  Tools  Actions  Help

Send | To... | manager@myCM.com; procurement@myCM.com
| Cc... |
| Bcc... |
Subject: | FW: Alert from Valdero Valdero has alerted me to the fact that our DOS for the CASE has gone above thresholds:
After investigation, I have found that the Quantity on Order component of DOS has spiked.
This spike is a direct result of a PO which we requested you to cancel.
We need to discuss how this PO ended up going through after we asked you to cancel it.

Please contact me ASAP

Sincerely,
N Bear

-----Original Message-----
From: valdero@valdero.com [mailto:valdero@valdero.com]
To: nbear@valdero.com
Subject: ALERT - DOS Above 60 for CASE has fired!
Priority: HIGH

FIG. 10

METHOD AND APPARATUS FOR PROVIDING INTELLIGENT AND CONTROLLED ACCESS TO SUPPLY CHAIN INFORMATION

BACKGROUND

The invention generally relates to methods and systems for retaining software objects and associated information and, more particularly, to a method and apparatus for providing intelligent and controlled access to supply chain related objects and documents in a database.

Most business entities have a perpetual need to inventory and exchange data among other business entities, both internally and with customers. Manufacturers, for example, have a constant need to inventory their product data in order to keep production flowing efficiently. As business arrangements become more complex, it becomes important to carefully organize and retrieve data that is shared among business partners. In some product markets, inventory orders can impact a business in ways that are difficult to predict. Businesses may depend on projections of such impacts to make informed decisions in a short amount of time. They may also be critical to a business's competitive edge. This becomes important as manufacturers are now outsourcing more and more products, further depending on outside business partners. When certain supplies or demands of products or individual components change, it affects inventory, product releases and other business-critical operations.

To complicate matters further, these business partners often exchange information electronically on different and incompatible formats. As a result, many businesses resolve this problem by actually exchanging paper documents among themselves. This of course seems absurd in light of modern day advancements in computer technology. However, most businesses that focus on producing products will not easily change their business practices at the administration level in fear of inhibiting their product flow. In order to gain acceptance by businessmen, any new method of exchanging data needs to be easily adaptable.

One approach is to custom design a system suited for a particular business organization. Many inventory systems exist that are particularly tailored to a user's needs. They are developed from basic software code routines that are used as building blocks. In reality though, these systems require that software code be written from scratch in almost every new application. The software architecture of such systems must be created and developed on an individual application basis. The result is a very high up front cost for each application.

In conventional applications, separate modules are created to perform certain tasks related to supply chain control. In order to monitor a supply chain in a meaningful manner, operation modules must integrate to some extent. Typically, modules such as reporting tools are custom made to a user's preferences, while other modules critical to the function of the reporting tool, such as data loading and data mining tools, are developed separately. The data loading and mining tools typically operate in a relational database, which requires some type of dynamic catalog to operate. In order to combine a reporting module with these operations, it must be integrated to use such a catalog. Unfortunately, integration of these entities is usually an afterthought. As a result, integration is very complicated, requiring special software code to build relationships among the modules. The end result is usually an inflexible custom application that is developed for a particular use, requiring ongoing development and maintenance at the database level. As a result, end users must rely on highly trained individuals to maintain such systems on site.

Therefore, there exists a need for a solution that can centralize information and allow access to certain supply chain information in an organized and useful manner. Such a solution would obviate the need for first line support at the user's site. As discussed below, the invention accomplishes this in a unique and elegant manner.

SUMMARY OF THE INVENTION

The invention is directed to a system and method for retaining and controlling supply chain information in the form of objects and associated metadata in a database to provide intelligent and controlled access to such objects. The objects may be accessed by multiple users according to predetermined rules, and may be integrated into an application by using metadata that defines such access. According to the invention, a system may include a server configured to monitor and to provide intelligent access to supply chain information. The system may include a repository for storing data and algorithms related to the retention and analysis of supply chain information, which may be explicitly developed by a user, or implicitly produced by dynamically monitoring and collecting information from an associated application. The system may also include an analysis engine configured to analyze supply chain information that is monitored and collected in the repository. A recommendation module may also be included for providing recommendations for activity related to a business supply chain.

BRIEF DESCRIPTION OF THE DRAWINGS

FIG. 6 is an example user interface 600 for gathering information from a user according to the invention;

FIG. 7 is another example user interface 600 for gathering information from a user according to the invention;

FIG. 10 is an example of a scenario interface according to the invention.

DETAILED DESCRIPTION OF THE INVENTION

Figure 1:
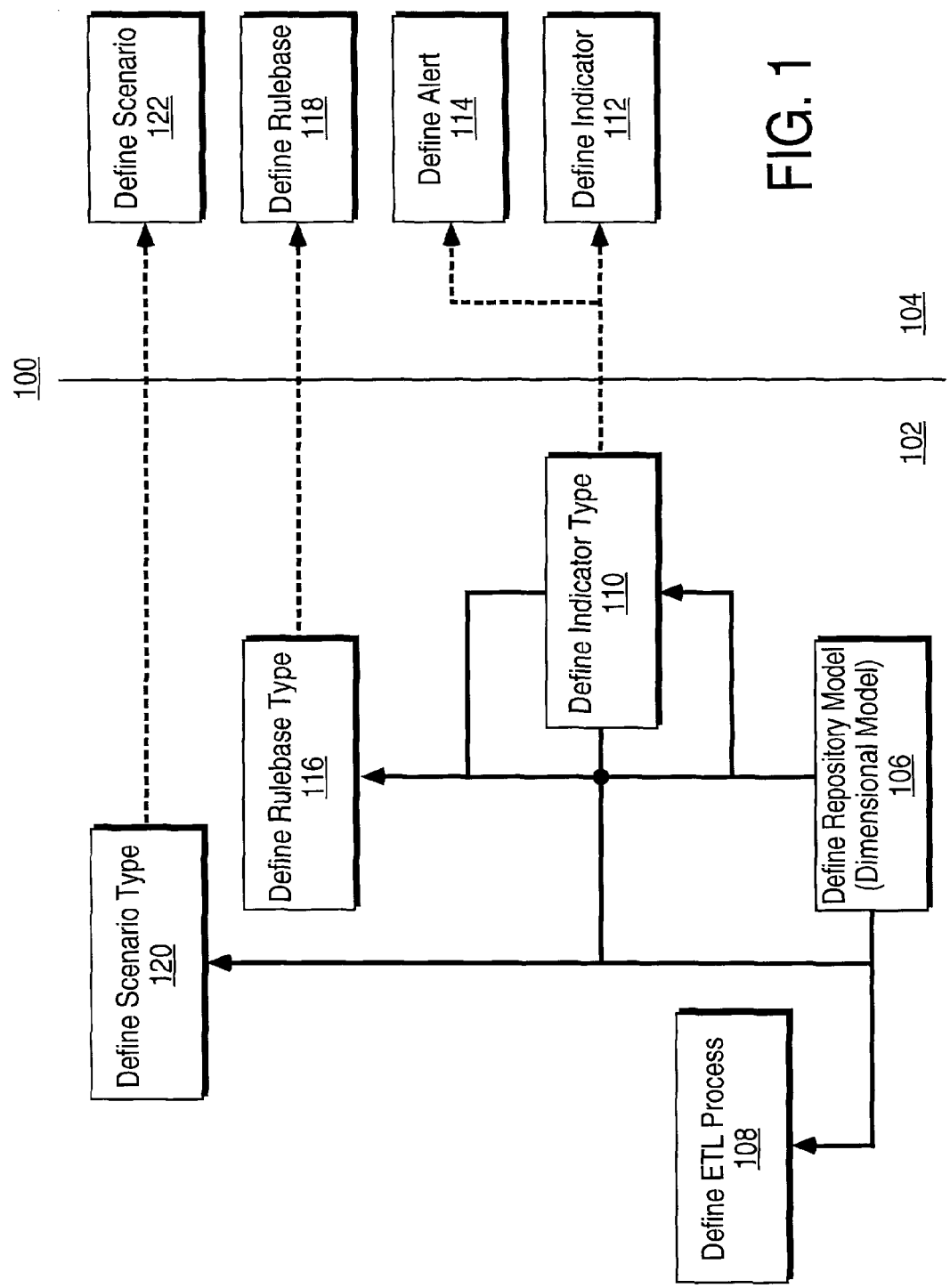
FIG. 1 is a diagrammatical flow chart of a system according to the invention.

The invention is directed to a system and method for retaining information in the form of objects and documents in a database and for providing controlled access to and analysis of the information, which may be by multiple users according to predetermined rules. According to the invention, a system or device may include a repository configured to store application instance type information and a central processing unit (CPU) configured to control access to the repository. Software for controlling such a function may include supply chain management code stored in memory and configured to allow intelligent and controlled access to type codes contained in the repository when executed by the CPU. The supply chain management code may further include an analysis server configured to analyze supply chain information originating from a business software application, an infrastructure server configured to provide application instances to a business software application for observation and dissemination, and an event server configured to perform predetermined functions in response events related to the business software application.

In one embodiment, the application instance type information may include indicator type code configured to produce an indicator instance defined by instance parameters. In such an embodiment, the indicator type code may be configured to produce an application specific indicator instance defined by the instance parameters. Some examples of an application specific indicator instance may include instances related to inventory applications, demand applications, engineering change order applications, cost applications, and other business related applications. In yet another embodiment, the application instance type information may include alert type code configured to produce an alert instance defined by alert parameter. The alert type code may be configured to produce application specific alert instance defined by predetermined alert parameters, such that the alert code causes alert functions to be performed according to events related to the application specific alert parameters. The alert type code may alternatively be configured to produce an instance associated with the business software application, wherein the instance is configured to cause a user of the business software application to be alerted to the occurrence of an event.

In another embodiment, the application instance type information may include scenario type code configured to produce a scenario instance defined by scenario parameters. The scenario type code may be configured to produce a scenario instance defined by predetermined scenario parameters, such that the scenario code is configured to cause analysis functions to be performed according to the parameters when executed. The scenario type code may alternatively be configured to produce an application specific scenario instance defined by application related parameters, such that the scenario code is configured to cause analysis of application produced data to be performed according to the parameters when executed.

In another alternative embodiment, rulebase type code configured to produce a rulebase instance defined by rulebase parameters may be included. The rulebase type code may be configured to produce a rulebase instance defined by predetermined rulebase parameters, such that the rulebase code is configured to cause functions to be performed according to the rulebase parameters when executed. The rulebase type code may be configured to produce a rulebase instance defined by predetermined rulebase parameters, such that the rulebase code is configured to cause functions to be performed according to the rulebase parameters when executed. The rulebase type code may also be configured to produce an application specific rulebase instance defined by application related rules and parameters, such that the rulebase code is configured to cause application related functions to be performed according to the rules and parameters when executed.

In operation, a device or system embodying the invention may be configured to perform a method of providing intelligent access to supply chain information. The method may include receiving supply chain information originating from a business software application, followed by analyzing the supply chain information originating from the business application by executing predetermined analysis algorithms stored in a repository. I regard to a business software that communicates with such a device or system, the method may include providing application instances to such an application in execution of the supply chain management code, wherein the instances provide indicators for observation and dissemination by a user. The device or system may then be capable of performing predetermined functions in response events related to the business software application.

Examples are described below that pertain to the exchange of supply chain information while producing a component part for a manufacturer. Unlike conventional methods and devices, the invention allows intelligent access by multiple users, or guests, of individual objects and associated documents stored in the system. The invention is particularly useful in helping entities such as product manufacturers when producing products and component parts throughout a product supply chain. It will be appreciated, however, that this is illustrative of only one utility of the invention, and that the invention has greater applicability.

In one embodiment of the invention, server architecture is provided that includes a dynamic operational infrastructure. This infrastructure operates on a type-object platform. In a preferred embodiment, the infrastructure code is configured using XML (Extensible Mark-up Language). XML is essentially a language that is used to define different types of documents used within organizations (such as purchase orders, sales orders) and inter-application APIs supporting business-to-business communications. This language is fundamentally composed of documents that have data and associated tags to separate and identify the data. According to the invention, this language is used to transmit documents that contain both data and associated metadata. This is in contrast with the prior art, in which files are transmitted separately from the identification information. In operation, web based applications transmit documents created under the XML platform to send data together with its associated metadata.

Those skilled in the art will understand that a type-object configuration is one in which instances are decoupled from their associated classes, so that the associated classes can be implemented as instances of a class. Johnson, et al., The Type Object Pattern, [PLoPD98] *Pattern Languages of Program Design* 3, edited by Martin, et al., Addison-Wesley, 1996. Those skilled in the art will also understand that, in certain applications, a class may require a number of instances and subclasses that may be unknown when the applications are designed and developed. The creation of classes usually requires the application to be recompiled, where the creation of instances can be done dynamically, such as at run time. The type-object platform allows instances to be divided up into two primary classes, one in which the instances represent the actual instances of an application, and another that represents the type of application instance. Therefore, since instances can be generated at run time and without recompilation, the use of a type-object platform effectively allows classes to be created dynamically at run time, without recompilation. One embodiment of the invention incorporates this feature into an application to produce instances to dynamically monitor and analyze information related to a supply chain.

The invention provides a means for establishing types of instances to be used in an application. The types are defined on a server, and are used to define the application instances for use by a user. This structure allows a user to define indicators, alerts, rule bases and business scenarios as instance types for dynamic monitoring and controlling of all aspects of a supply chain. These instance types are used to instantiate the corresponding application instances. This allows a user to define the parameters of objects located on the server such as indicators, alerts, rules bases and scenarios to be manifested as instances for use by the business application user to analyze and observe supply chain related information. Thus, the types are used as tools to assemble building bocks for the application and encode knowledge of the application domain, such as the supply chain.

According to the invention, the general infrastructure is integrated similarly to the operations of a relational database. The infrastructure operations of the server are founded on the use of metadata. In XML language, the code is essentially a tag-oriented language, where data payload data is transmitted along with a corresponding tag that identifies the data. According to the invention, the tags in XML are represented by metadata. Metadata generally refers to the attributes of information, such as that stored in a file or other organizational fiction, that include information relating to the file. Essentially, metadata is data that describes other data. Similar to an index, the data describes data, whether it is stored in a file or other location. Such metadata may include, for example, the size of a file's contents, a time stamp indicating when the file was created or when the file contents were last changed, an identification of an owner responsible for the file, an identification of an object or group to which the file or its owner belongs, and other information. Metadata may also include security information for restricting access to the file for performing read and write operations on the file. Information such as permissions to access the file may be as critical as the actual content for work that is in-progress, which may be the product of integrating information created in one area with that created in another area. In this regard, security may limit access to particular indicators by certain users. The security may be on the data level, where users are restricted to analyze data they have been granted access to. The security may also be at an object level, where users are restricted from accessing certain indicator types, scenarios and other application functions. The security may also include sharing access to objects with other users. Users that host or otherwise control the objects may offer other users limited access. Metadata may also include extended attributes that may relate the metadata of one file to that of another file. The invention is directed to the intelligent and efficient access and control of supply chain information that may be identified by such related metadata.

Referring to FIG. 1, in one embodiment of the invention, an intelligent supply chain control system 100 is illustrated in a functional diagrammatic manner. The system has two major components, the system sever side 102 and the application side 104, which communicate with each other via an interface (not shown). Generally, the application side includes software applications that are utilized by a business in controlling and managing supply chain information. Each application may be serviced by one or more servers. The server side of the system is configured to maintain instance types, related data, rules and formulas that define the operations of applications located on the application side. In conventional business applications, each separate application operates independently, generating results without regard to other applications. Many business applications, however, share common attributes that can be utilized for supply chain analysis, control and management. According to the invention, a system and method are provided for integrating some of these common attributes for analysis, control and management of a supply chain and related information. This unique intersection of related information that exists among business applications may now be leveraged to provide analysis of the overall supply chain of a business. As discussed further below, this analysis may also be used to provide recommendations for actions that may be taken in certain situations.

A repository 106 is defined when an application is integrated with the data sources of the system, where the application stores domain entities in a form optimized for access by the application users. The model under which a repository operates defines the manner in which information is stored. This may be different for different applications. For example, in an inventory control application, a repository may be defined under an inventory monitor and control model, where the metadata in the repository is configured under inventory type instances. Other models that correspond to other applications may include ordering models, demand management models, engineering change order (ECO) models and other business-oriented models. The repository further defines the manner in which information is integrated among the modules in the server as expressed in the objects defined in the application. This is described in more detail below. This repository works in conjunction with the extract transfer load (ETL) process 108, which defines the manner in which data is transmitted between the data sources of the system and the application.

Figure 2:
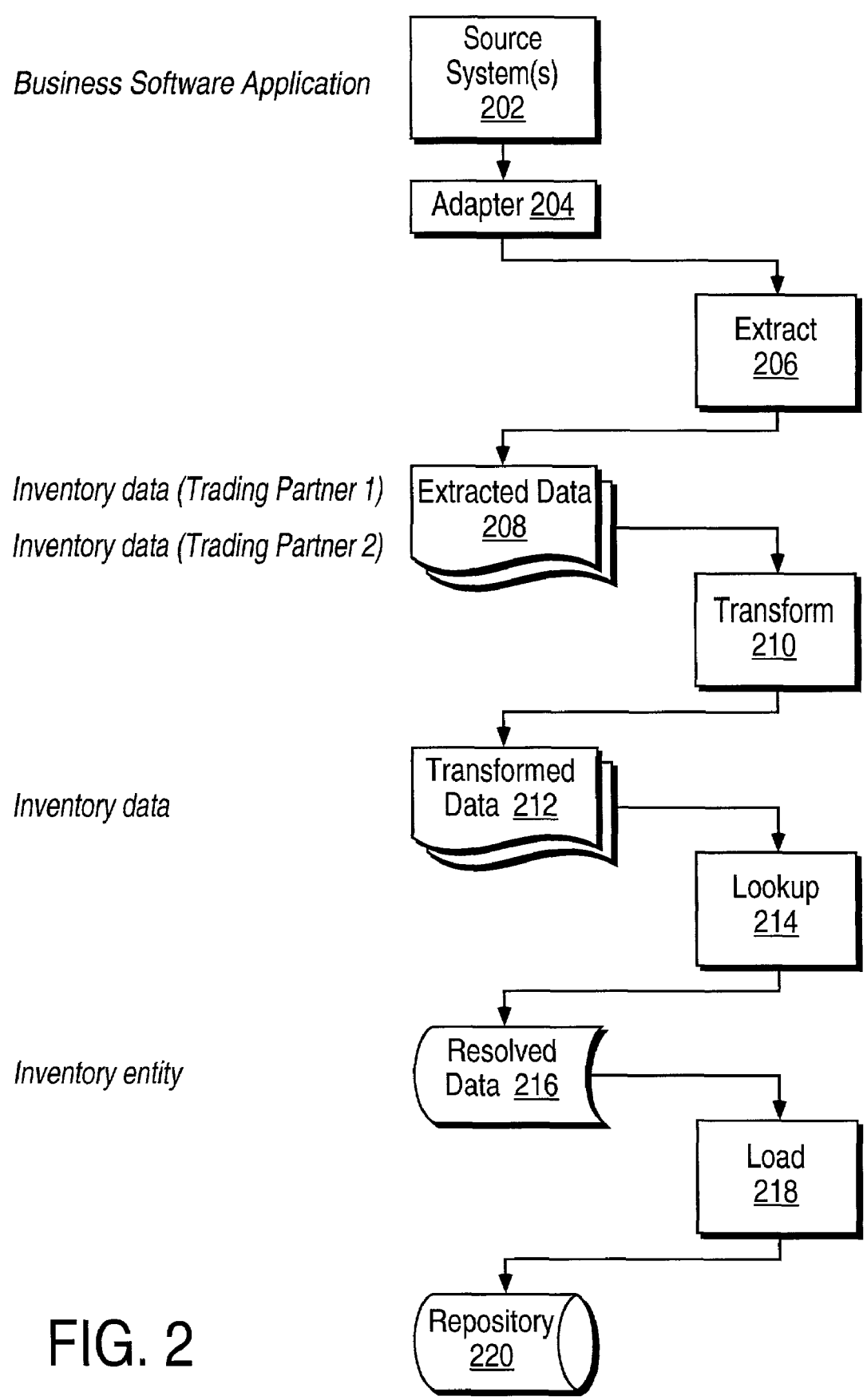
FIG. 2 is a diagrammatical flow chart illustrating an example of the ETL process according to the invention.

Referring to FIG. 2, a flow diagram is shown to illustrate the ETL process in more detail. Generally, the source system, such as an application system, originates data to be used and disseminated in the supply chain control system. For example, an inventory control system may originate inventory data that identifies parts by name or number, associated inventory levels and locations, and other information related to inventory. An ETL process defines the source system and all data transformations that are performed on the incoming data before storage within the repository. The process includes first sending data from a source system 202 to an Adapter 204. Adapters are distributed components that embed application specific logic used by an application for reading and writing data. Application specific adapters are special cases of technology adapters for particular applications. Examples include relational data base systems, flat files, and other types of applications. The adapters enable a source system to communicate with the server system via data transmissions.

Next, data is extracted in step 206 using the adapter. The extract step of an ETL process, reads data from specified source systems, typically external applications, using a specific adapter. Extracted data 208 may then be compressed and transmitted to a server hosting its repository. For example, inventory data may be extracted from an ERP system or received from a trading partner. Such data may then be extracted using an adapter and transmitted to a server that hosts the inventory repository.

The extracted data may then be transformed in step 210. This transformation step applies varies transformation rules to the extracted data. Such rules can be used, for example, to replace application specific codes with descriptive strings. Rules may also replace missing data with specified default values, which may be predetermined or otherwise generated. The rules may also split one extracted file into multiple output files. Other transformation rules may be applied in the transform step to enable various configurations in server functions.

In order to properly categorize incoming transformed data 212, identifiers must be assigned. The lookup step 214 assigns internal identifiers to the transformed data. Internal identifiers map incoming business keys with entity instances stored within the Repository are represented as small integers. This step relates extracted data with business concepts and assists in tracking changes to entity instances. This unique identification of the data is a precursor in preparation for final loading into the repository. This step helps prepare the data to ensure that there is no downtime required in moving new incoming data into the Repository. The resulting data and associated identifier make up resolved data 216 for loading into the repository. The load step 218 is a process for moving the incoming resolved data into the repository. The indexed data is easily loaded into the repository 220 according to its identifiers. The repository stores data in a unique dimensional form. The special indexing of the data optimizes access by the application users for transmitting and extracting data for use in a supply chain control and management application. According to the invention, the structure of the repository is designed to support ad-hoc queries against the stored entities. This aspect of the invention allows for flexible analysis to gain insight into the various activities within the supply chain.

Instance types are predefined to a large extent on the server, and are used from a library of instance types to build the repository for an application. The instances that exist on an application side of the system point to a corresponding instance type located on the server side. An instance is an electronic representation of and object type in another location, which is known in the art as an instantiation of an object type. According to the invention, an instance located for use by an application is an instantiation of an object type located on the server. The definitions of the instance types include two main types of parameters, those that are mandatory and those that can be further defined. The metadata associated with a particular instance defines the parameters of that instance.

An indicator is one type of instance that identifies a particular type of data to be monitored by an application. An indicator can define how data is retrieved, utilized, organized and disseminated in the operation of the application. Indicators are representations of complex formulas associated with predetermined parameters when created. For example, indicator types may be composed of formulas that can generate inventory values, such as inventory levels, days of supply, quantity ordered, quantity on hand, days on hand, days in order, etc. These values are defined by individual inventory types, and are given values when defined on the application side of the system. The definition of the indicator type 110 (FIG. 1) is stored on the server side in the repository. The indicator type points to a corresponding object that defines an indicator 112 located on the application side of the system. An alert definition associates triggering and evaluation conditions with an indicator that specifies business conditions that are of interest to a user.

For example, one indicator type that is often used in inventory applications is days of supply (DOS). DOS indicates the number of days a business' supply will last until it is depleted by incoming demand. An indicator for the DOS for a particular item such as a component part would identify the part, such as by name or part number, along with other information for identifying the part. The site location or locations may also be included in the indicator type to indicate where such parts are located within an organization. Other information related to such a part may also be included in an indicator type.

Referring again to FIG. 1, the indicator type may define an alert 114 as well. Alerts, which are operational in nature, are instances of indicator types that can be configured to perform a function upon the occurrence of an event. According to the invention, events may be defined in a particular alert instance according to particular parameters. For example, an alert may be associated with a DOS indicator as discussed above. Such an alert would identify a particular component part, such as by name or part number, and may also include other identifying information. As an alert, the indicator would have one or more ranges for monitoring the status of the days of supply. These ranges may be used to alert interested persons to shortages, surpluses, or other inventory related events or issues.

According to the invention, an alert may be defined in many different ways to alert interested people to different situations. For example, an alert may be configured to send an email message to an interested party upon the occurrence of an event. In a web based supply chain application, objects located within an application may be updated upon events such as the opening or refreshing of a user's web page. A user of the application may set these parameters.

The definition of the indicator may have a number of parameters by which it is defined on the server side. An indicator type contains a formula used for calculating its value which may refer to user supplied parameter values, other indicator types and/or arithmetic expressions. The definition also includes the valid set of parameters that are applicable for the specific indicator type along with information about their domains (data types, valid values, validation constraints, etc.). In the context of alerts, additional constraints specifying the exception threshold values are also added.

Another instance that may be utilized in an application is the rules base type instance 116. The rules base types are generally related to indicator types and can define custom operations to be used on indicators defined within an application. According to the invention, the parameters of the rules base instance on the application side would be broad enough to provide enough flexibility for use with an application. However, they would need to be defined to an extent that allows a user on the application side to easily define the rules base 118. Accordingly, an embodiment of the invention may include certain predetermined rules in the rules base. These rules may be of several types, including algorithms for processing or otherwise transforming data, operations that may be triggered by circumstances defined according to a rule, and other types. Instances of rule base types are used to control and configure specific aspects of application algorithms associated with scenarios, recommendations and simulation functions discussed below. Simulation functions allow a user to play out a fictional scenario for predicting potential impacts on changes in business processes. Scenarios are instance types that define how data is monitored and controlled. According to the invention, scenario types 120 are predefined on the sever side. Scenarios may be further defined by scenario definitions 122 on the application side. In this regard, scenarios may be representations of interactive analysis between the server and application side. Predetermined parameters may exist on the server side, and other parameters may be definable by a user establishing a scenario on the application side. For example, one Scenario type may include two-dimensional grids that illustrate supply chain data according to parameters. Another may include two or three-dimensional graphs to illustrate trends. Scenarios are generally built on the building blocks of indicators, and other entities within the repository model. They provide tools and formulas to transform and present data in a meaningful and useful way for users who monitor and control a supply chain. The invention provides a means to intelligently guide users in disseminating information related to supply chain control. Thus, in using a system embodying the invention, a user can set up and maintain a system without the need for first level support. According to the invention, scenarios may include the ability to simulate operations of an inventory control application. For example, a user may run a simulation to determine how to distribute or otherwise supply an inventory in the event of a shortage. Although orders may be promised to multiple customers or business partners, situations arise where they simply cannot be met. A scenario may be executed to simulate different supply scenarios among supply recipients given the shortage. The user can then determine how different scenarios would impact the business, whether it is determined from a bottom line perspective, a legal liability perspective, or according to other criteria, which are encoded as rule bases. The result may be certain outcome predictions, strategy plans or recommendations. These results may be based on predetermined criteria developed when the system is first set up, such as rules base types or key indicators, or by user criteria, or by a combination of both.

Figure 3:
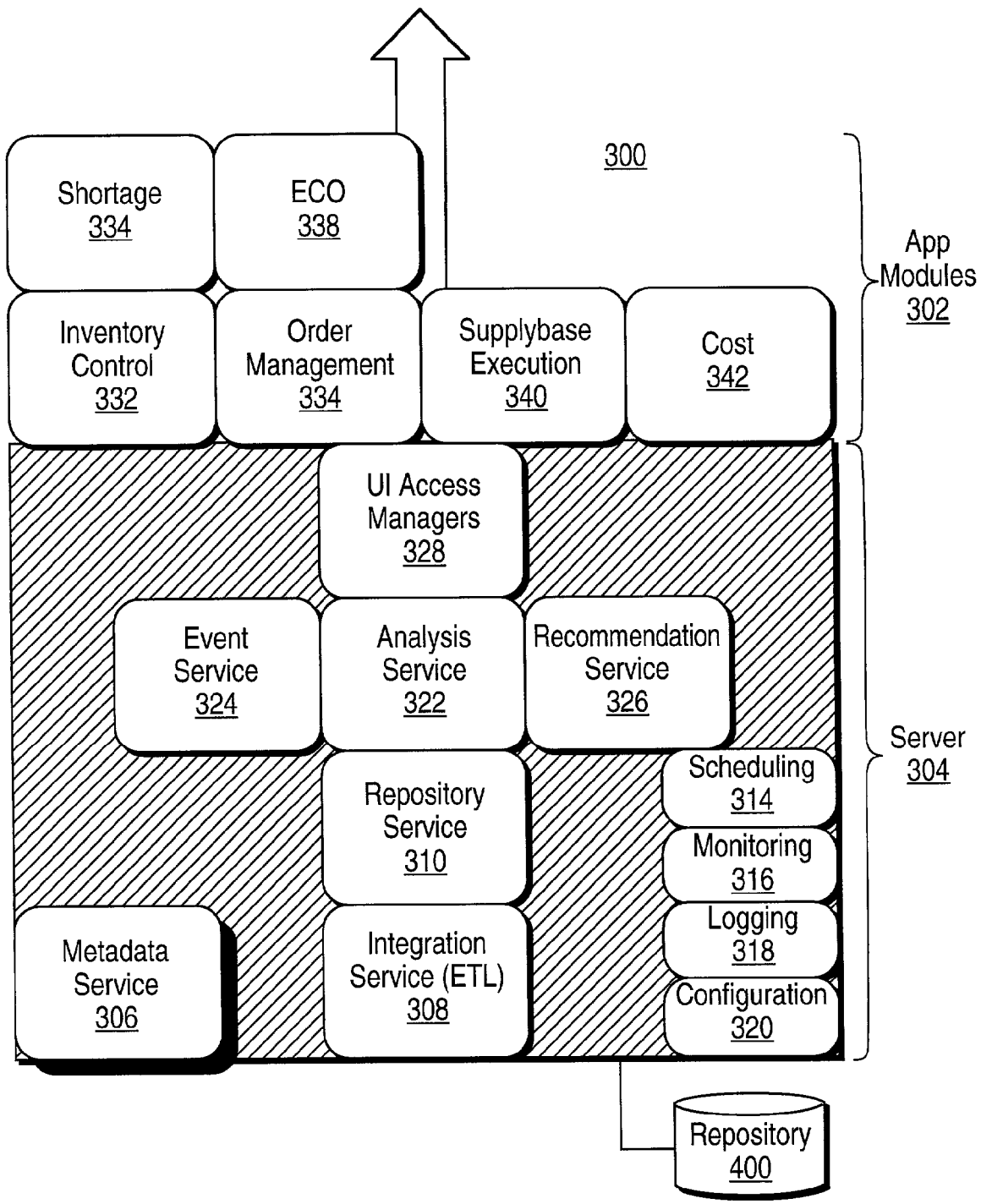
FIG. 3 is a diagrammatical view from and architectural perspective according to the invention.

Referring to FIG. 3, a more detailed diagrammatic view of a system 300 according to the invention is illustrated from an architectural perspective. As in the functional diagram illustrated in FIG. 1, the system 300 is divided into application modules 302 and server modules 304. The server provides building blocks for developing an integrated intelligent supply chain application for monitoring and controlling supply chain information. The server includes a number of service modules that establish an infrastructure for developing type-object relationships between the server and corresponding application modules. These modules may be comprised of software code that, when executed by a central processing unit (CPU), cause certain functions to be executed. The metadata service module 306 is configured to provide a catalog of metadata, such as application and repository metadata that are associated with the respective application and repository data. Utilizing this catalog, the server modules are able to access and organize data and associated metadata in developing and maintaining applications.

The integration service module 308 is configured to perform ETL functions, which define the manner in which data is transmitted between the server side and the application side. This module works closely in conjunction with the repository service module 310, which defines the manner in which information is stored. The repository further defines the manner in which information is integrated among the modules in the server as expressed in the objects defined in the application. The caching operations 312 are configured along with both the integration module and repository to store information that is frequently accessed, providing quick and efficient access to such information. Once the repository model and the ETL process are established, the instance types can be defined, and the database corresponding to an application can be developed.

Figure 4:
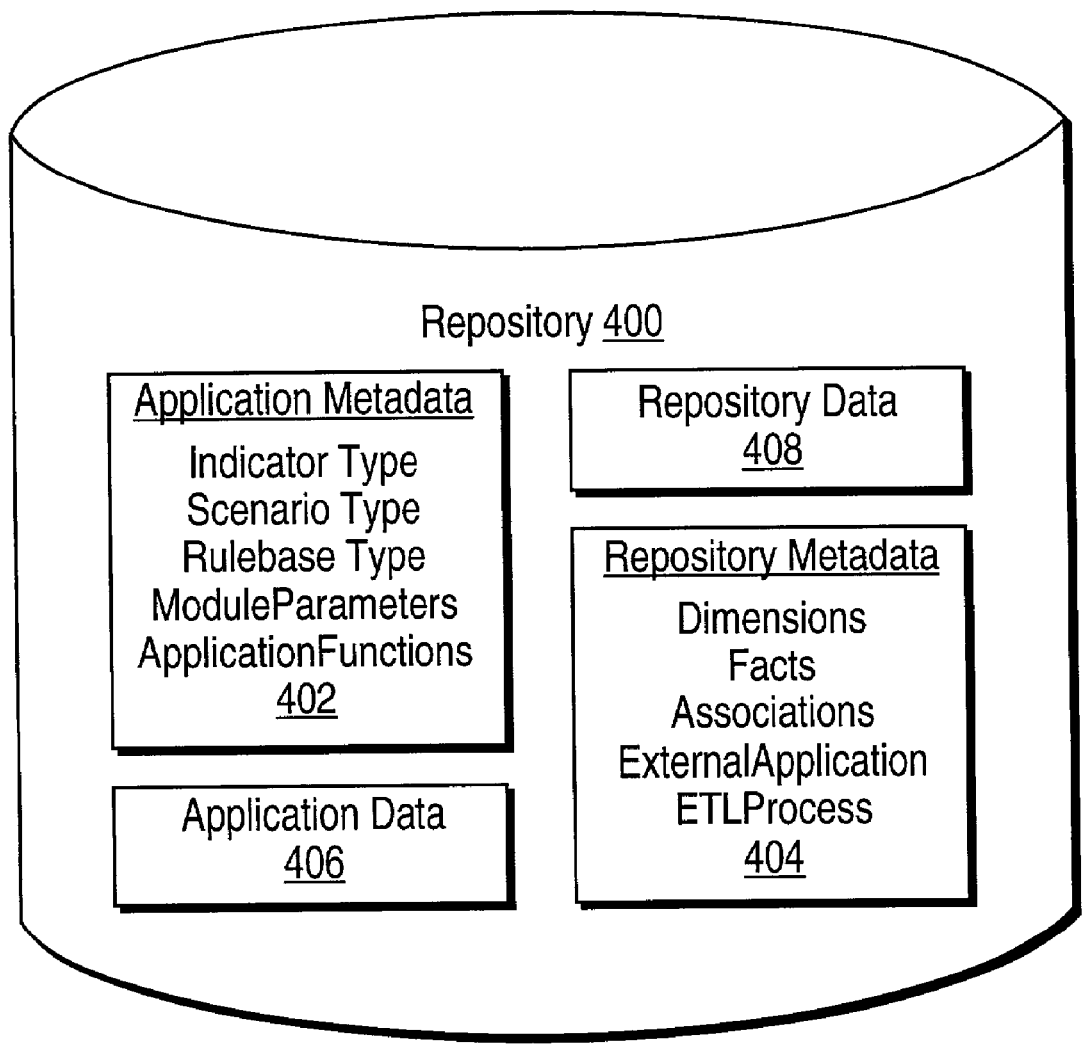
FIG. 4 is a detailed diagrammatical view of a repository according to the invention.

Referring to FIG. 4, a diagrammatic view of a repository database 400 is illustrated. Generally, two types of metadata are stored in the repository, application related metadata 402 and repository related metadata 404. Also stored in the repository are the actual application data 406 corresponding to the respective application metadata, as well as the actual repository data 408 corresponding to the respective repository metadata. The application metadata includes metadata that identifies the instance types that are defined in the server that drive the corresponding objects in the application on the application side. Metadata and data corresponding to module parameters of an application may also be stored in the repository. Repository data and corresponding metadata pertains to data transmitted between the source system and the application, as well as the manner in which the transmissions occur. Such repository data may pertain to particular dimensions and facts pertaining to an application. Such dimensions and facts may include those pertaining to a product or component whose supply chain is being monitored and controlled. Associations and other relational information may also be stored in the repository. Association information may include information pertaining to associations of modules with ERPs, application service providers (ASPs), internal sources of data. Association data may also pertain to external sources of data, such as original equipment manufacturers (OEMs), component equipment manufacturers (CEMs), value added resellers (VARs) and other sources. Together, the application and repository data and corresponding metadata are stored in the repository for access to other modules on the server side of the system. Once the repository model and the ETL process are established, the instance types can be defined, and the database corresponding to an application can be established.

Referring again to FIG. 3, basic operation modules, such as scheduling 314, monitoring 316, logging 318 and configuration 320, are configured to perform operations that may be utilized by numerous modules operating in the sever. These modules provide core services to the rest of application modules.

Once the integration module and repository module are established, a user can execute analysis functions in order to monitor and control supply chain data. Still referring to FIG. 3, the analysis service module 322 is configured to analyze supply chain data according to defined scenarios as discussed above. The analysis can include the use of tools and formulas configured to disseminate information, and to parse and process data in a meaningful manner. The analysis module operates in conjunction with first level service modules, such as the repository, integration and metadata service modules, to enable a user to analyze relevant data for a particular scenario. Utilizing the analyzer, a user can intelligently execute a particular analysis given a predetermined scenario. Given the query, the analyzer is able to determine what rules apply, where to get relevant data, what formulas apply if any, and other information. The analyzer determines these criteria based on the metadata associated with the scenario.

The recommendation module 326 is configured to provide recommendations of actions to be taken given certain scenarios. For such recommendations, analytical models may be utilized to reach certain results, perhaps a variety of recommendations from certain scenario results. Explicit rules may be integrated in the recommendation module that produce results in response to certain input data from scenarios or other sources. Implicit methods may also exist to derive results from historical data and trends. Conventional data mining techniques may also be utilized to track trends in past performance of business applications. It will be understood by those skilled in the art that several data mining techniques exist that may be integrated in a recommendation service to mine out data from a data repository to produce such historical data and trends.

The event service module 324 is configured to define particular events that may occur in monitoring and controlling supply chain information. This module also works in conjunction with the repository and integration service modules to access relevant data and associated metadata associated with certain events. When instances of indicators are defined with an alert in the application object, events generated in the event service module can trigger the appropriate alerts according to their definition. For example, information relating to inventory levels may be compiled in an application's repository. The event module can be configured to generate an event alert when inventory levels reach different ranges, such as low inventory, high inventory, etc. The event module could then trigger an alert indicator when inventory reaches these predetermined ranges. The event module may generate event information in response to particular indicators defined in an application, to scenarios, and other entities that are relevant to an application's events.

The user interface (UI) access manager module 328 acts as a gatekeeper or interface between server operations in the server 304 and application operations in the application 302. The UI module is configured to enable the exchange of information in its many forms between the application and server module. The UI is generated and configured dynamically by the server 304 based on the stored metadata.

On the application side of the system, application modules may be developed and integrated with the server modules. These application modules may comprise one or more layers of functionality, and may be integrated with other application modules and even server modules according to each module's metadata. According to one embodiment of the invention, the application modules include objects that are instances of the types defined on the server.

For example, the inventory control module 332 is configured to monitor and control inventory information such as inventory quantity and other factors relevant to inventory. Another application module such as a shortage module 334 may monitor and control shortages. Similarly, yet another module such as surpluses (not shown) may be another extension of the inventory control module. Such extended modules are yet further objects that are instances having corresponding categorical type defined on the server. The relationships among the application and server modules are attributed to their corresponding metadata that identifies each module and its relational attributes. The inventory control module may be configured with rules bases, formulas, algorithms and other analytical tools that are useful for monitoring and controlling inventory. These entities may be integrated with instances that such as indicators and related alerts. The alerts may be generated in response to predetermined events, such as inventory losses, changes in inventory on hand, changes on inventory available, and other inventory measurements. The alerts may be executed by the event service module 324.

As another example, the order management module 336 is configured to manage the incoming and outgoing orders for inventory items, such as products, component parts and other related items. Generally, the order management module manages the order fulfillment process.

An ECO module 338 may be configured to monitor and manage engineering design and manufacturing changes. ECOs can be critical to the supply chain process, as it can affect multiple aspects of the process. The Eco module may be integrated with server 304 to retain and analyze ECO related supply chain data.

The supply base execution module 340 is configured in the application to monitor and control a user's supply base. The supply base execution module is configured to monitor and manage a business' suppliers. The module may monitor a supplier's execution history, responsiveness history, and other performance criteria that may be useful to a business in monitoring and managing suppliers.

The cost module 342 is configured to monitor and control costs associated with a supply chain. The relationships among cost module and the application and server modules are attributed to their corresponding metadata that identifies each module and its relational attributes. The cost module may be configured with rules bases, formulas, algorithms and other analytical tools that are useful for monitoring and controlling costs of products, component parts, and other cost liabilities. These entities may be integrated with instances that such as indicators and related alerts. The alerts may be generated in response to predetermined events, such as cost increases and decreases, whether they result from inflation or engineering changes, or other factors that have impacts on business costs. Such alerts may be defined in conjunction with the event service module 324.

In order to fully establish an integrated application capable of defining and measuring operational performance of a supply chain, the individual application modules must be configured by defining the proper indicators, corresponding alerts, events and scenarios. These parameters will drive the integrated system according to the user's predefined and ever evolving parameters and criteria. According to the invention, these parameters may be established upon initial setup of the system. Furthermore, the invention provides the ability to further define and dynamically change and integrate an application's parameters at a user level. Since the more complicated code is predefined and compartmentalized, a user merely needs to redefine the parameters according to the function changes desired. According to the invention, these characteristics allow an application to evolve with a supply chain; where its parameters may be changed or otherwise improved without the need for first level support.

In setting up such instances, security parameters may be included to limit access to particular instances by certain users. These security parameters may apply to indicators, alerts, and scenarios. The security may be developed on the data level, where certain users may be restricted from accessing data such as certain products and customers. Similarly, the security may also be at an object level, where users are restricted from accessing certain indicator types, scenarios and other application functions. The security may also include sharing access to data or objects with other users. Users that host or otherwise control the objects or data may offer other users limited access. Many types of security configurations are well known in the art, and those skilled in the art will understand that many types of security measures may be configured in an application as would be appropriate for a particular application.

Figure 5:
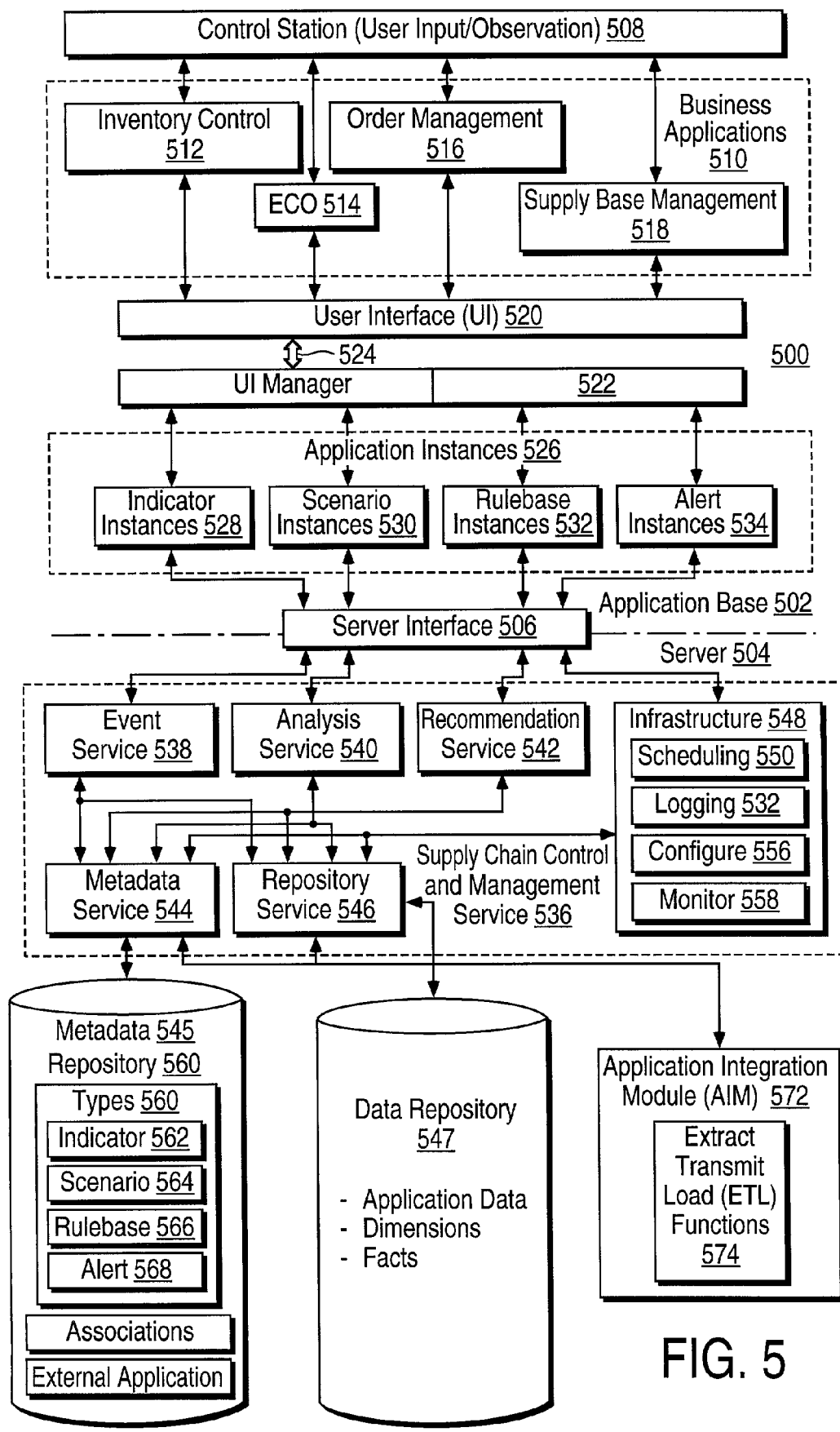
FIG. 5 is a diagrammatical view from and architectural perspective according to the invention.

Referring to FIG. 5, a more detailed example of a supply chain management and control system 500 is illustrated in accordance with the invention. Generally, the system can be separated into two parts. The application base 502 is a system typically located physically at a place of business where supply chain information is generated, observed and otherwise utilized. The base is unique to a particular user, and may be configured with numerous applications related to supply chain monitoring and control. The server 504 is configured to serve and support the application base, and to store vital information related to the applications. Although the server is described herein as a single server for serving possibly multiple business applications, it is also contemplated that the functions and features may be incorporated in a distributed system, where multiple servers provide service to one or more business applications, possibly spread out geographically. These applications even themselves be in multiple servers and geographical locations. It will be understood by those skilled in the art that the invention may be incorporated in a multitude of configurations without departing from the spirit and scope of the invention as defined in the claims.

The system as a whole provides integration between certain business applications and a server to provide intelligent supply chain control and management. This includes gathering, monitoring and analyzing data, as well as retaining data and related historical and analytical information. The two parts communicate through a server interface 506. The server may be located on site with the application base, or may communicate with a dispersed system. Similarly, the server interface may be located either on site or with the server. Those skilled in the art will understand that communication among the various components of the system 500 may occur at various junctures of the system and by various means, and that various functions may be performed at disparate physical locations. Communication among any such dispersed functions or components may occur through a dedicated communication link, a network system such as a local area network (LAN) or the Internet, or other communication medium. The invention contemplates such systems and the various configurations and communication means that any particular application may encompass, and is in no way limited to any particular configuration.

From an operational perspective, the system begins its overall process at a user input and observation location called "control station" 508. The input may be of various forms depending on which business applications 510 are employed by a business and how they are integrated in business processes including supply chain control and management. Such input may include order information from internal component and supplies ordering operations, from retail mail or website ordering operations, from user input at key sales locations, and from various other types of data input. For example, an inventory control application 512 may be employed by a business to track supplies, monitor surpluses and shortages, retain information related to predetermined projections, and gather other inventory related information. Similarly, an ECO application 514 may receive input information related to changes in product specifications from an engineering department. An order management application 516 may receive information related to internal product or component part orders, or to outgoing orders. Supply base management application 518 may receive information related to suppliers such as performance, execution data and other data related to outside vendors or other entities supplying a business.

Different supply chain applications receive disseminate information in different ways. However, there are certain indicators that are common to various applications. For example, days of supply (DOS) is an indicator that is relevant in a business sense to all supply chain applications. It is also valuable to combine application indicators with other application indicators in analyzing a business. For example, an engineering change order generated by the ECO application 514 may have an impact on inventory factors handled by the inventory control application 512. In conventional systems, separate applications would be required to combine and disseminate common information among the applications. These systems rarely if ever are able to fully integrate supply chain information. According to the invention, these indicators are utilized in universal application among the business applications for observation and analysis. Unlike the prior art, these indicators can also be used as analytical building blocks for retaining, managing and controlling supply chain information.

Still referring to FIG. 5, the business applications communicate with user interface (UI) 520. The UI is configured to receive data from each application, where each application may have disparate communication platforms. This information is communicated to UI manager 522 via a communication link 524. The UI manager is configured to control indicator information generated by the business applications. The UI manager is driven by application instances 526, and includes indicator instances 528, scenario instances 530, rule base instances 532 and alert instances 534, which are manifestations of object types stored on the server 504. These are discussed in more detail below. These instances define an indicator for use in a particular application or applications, and are virtual manifestations of each instance's type object counterpart in the server 504.

The application instances communicate with supply chain control and management services 536 via the server interface 506. These services maintain the instantiated representations, such as the application instances 526, of application base 502. The services provide the means to retain and analyze data received by business applications 510. The instances 526 are the vehicle by which such data is so utilized. The event service 538, analysis service 540, recommendation service 542 and infrastructure service 548 are the driving entities for the application instances 526. Each service communicates with metadata service 544 and repository service 546 to access the metadata 545 and data 547 respectively.

Application integration module (AIM) 572 is configured to govern the transmission of data between the server 504 and application base 502. The extract, transmit and load (ETL) functions application 574 is configured to govern such transmission of data. Transmissions may include the extracting of data from the application instances 526, transmitting data between the application base and the server, and loading the data into the repositories 545, 547 respectively.

Infrastructure service 548 is comprised of software code configured to generally facilitate the monitoring, retention and analysis of supply chain data. The infrastructure service provides the functionality for maintaining an application's supply chain related data in the metadata repository and the data repository. The infrastructure includes scheduling code 550 configured to establish the scheduling of certain events to occur in servicing a particular application. Scheduling may include periodic delivery of information to an application, such as a daily report, or a periodic or real time update of data related to a business application or other services that may include a temporal property,. Logging code 552 is configurable to record data transactions among various entities in the server. Information to be logged may include messages, exceptions and other information related to the operations of the server. The configure code 556 is capable of configuring an application base 502 to operate in conjunction with server 504, and, in particular, services 536. The configure code is relative to property files that enable functions such as renaming devices communicating within a network, locating where to log information, looking up logging information from a memory location, and other functions. Monitoring code 558 is configured to monitor the operations of the server, such as whether the server is up and running, whether faults occur, and other operational factors.

Referring back to the application instances 526, each instance is a manifestation of a corresponding object type 560 stored and maintained in metadata repository 545. In a preferred embodiment, the types stored in the metadata repository 545 are metadata that identifies the attributes of a particular instance, whether it is an indicator 562, a scenario 564, a rule base 566 or alert 568. The indicator instances represent instantiations of particular instance indicator types 560 used in the application base, and are defined in the metadata repository. The scenario instances 530 are instantiations of scenarios defined server 504, and represent instantiations of scenarios used in the application base. Rule base instances 532 are instantiations of predefined rules stored on server 504. The alert instances are similar to the indicator instances, but further include an alert feature for alerting a person or entity of a condition, a shortage of supply for example.

Given the particular object types, each type may be manifested in the application base as an appropriate application instance. Upon setup of such a system, information is received from the user input 508 to define the parameters of each particular instance. A user inputs data to establish parameters according to the indicator types, establishing instances for governing the retention and management of supply chain control data. This data is then saved in the server to establish corresponding metadata in the repository 545 and related data in data repository 547. Such data may include inventory product data such as dimensions, related facts, associations such as related component parts, external application information, such as user site applications, and ETL process information for a particular application.

For example, in setting up an instance for days of supply (DOS), an indicator type 562 would be selected from the metadata repository via the configure code 556 in the infrastructure service 548. Referring to FIG. 6, a sample user interface 600 for gathering information from a user is illustrated. First, the user would select the type of indicator from the type selection window 602. Next, parameters are set for the indicator. The display name for the indicator is chosen in window 604, and an optional description of the part may be illustrated in window 606. Product families may be chosen in window 608, and commodity codes may also be indicated in window 610. The part name or number may be indicated in widow 612. The customer or other entity for which the inventory part is held for, or promised to, may be indicated in window 614. The time period during which the indicator is in effect may be set in window 616. Indicators may be identified by indicator icons that change upon the change of status of the part or other item being monitored. Thresholds 618 may then be set for triggering such changes. If a lower threshold is needed to trigger an indicator, it may be entered in window 620. If a higher threshold is preferred, it may be entered in window 622. For an icon illustrating status quo within an acceptable range, such a range may be entered in windows 624 and 626 respectively. The actual icons to be displayed when either of the thresholds is reached can be chosen in icon selectors 628 ad 630 respectively. As illustrated, indicators may be designated by icons that indicate a positive condition as illustrated in the lower threshold 628. They may also be designated by an urgent condition, as illustrated in the higher threshold 630. In this illustration, icon 632 indicates whether the level is within the range, or is otherwise not shown. The result is a final indicator would eventually be manifested as an indicator instance in the application within indicator instances 528, under the guise of the UI manager 522 (FIG. 5).

As another example, an instance of an alert may be set up similarly to an indicator. Referring to FIG. 7, a sample user interface 700 for gathering information from a user for an alert is illustrated. First, the user would select the type of alert from the type selection window 702. Next, parameters are set for the alert. The display name for the alert is chosen in window 704, and an optional description of the part may be illustrated in window 706. Product families may be chosen in window 708, and commodity codes may also be indicated in window 710. The part name or number may be indicated in widow 712. The customer or other entity for which the inventory part is held for, or promised to, may be indicated in window 714. The time period during which the alert is in effect may be set in window 716. Alerts may be identified by indicator icons that change upon the change of status of the part or other item being monitored. Thresholds 718 may then be set for triggering such changes. If a definitive threshold is desired to trigger an alert, it as well as the type of threshold (equal to, greater than, less than) may be entered in window 720. If a range is preferred, it can be entered in window 722. Since the instance is an alert, a level of urgency can be indicated in window 724. A type of notification can be designated in window 726, such as an email notification to an interested party, an icon alert to a webpage, or some other alert. The alert may be designated as active or inactive by indicators 728. Similar to the indicators, alerts may be shared with other users in window 730.

Figure 8:
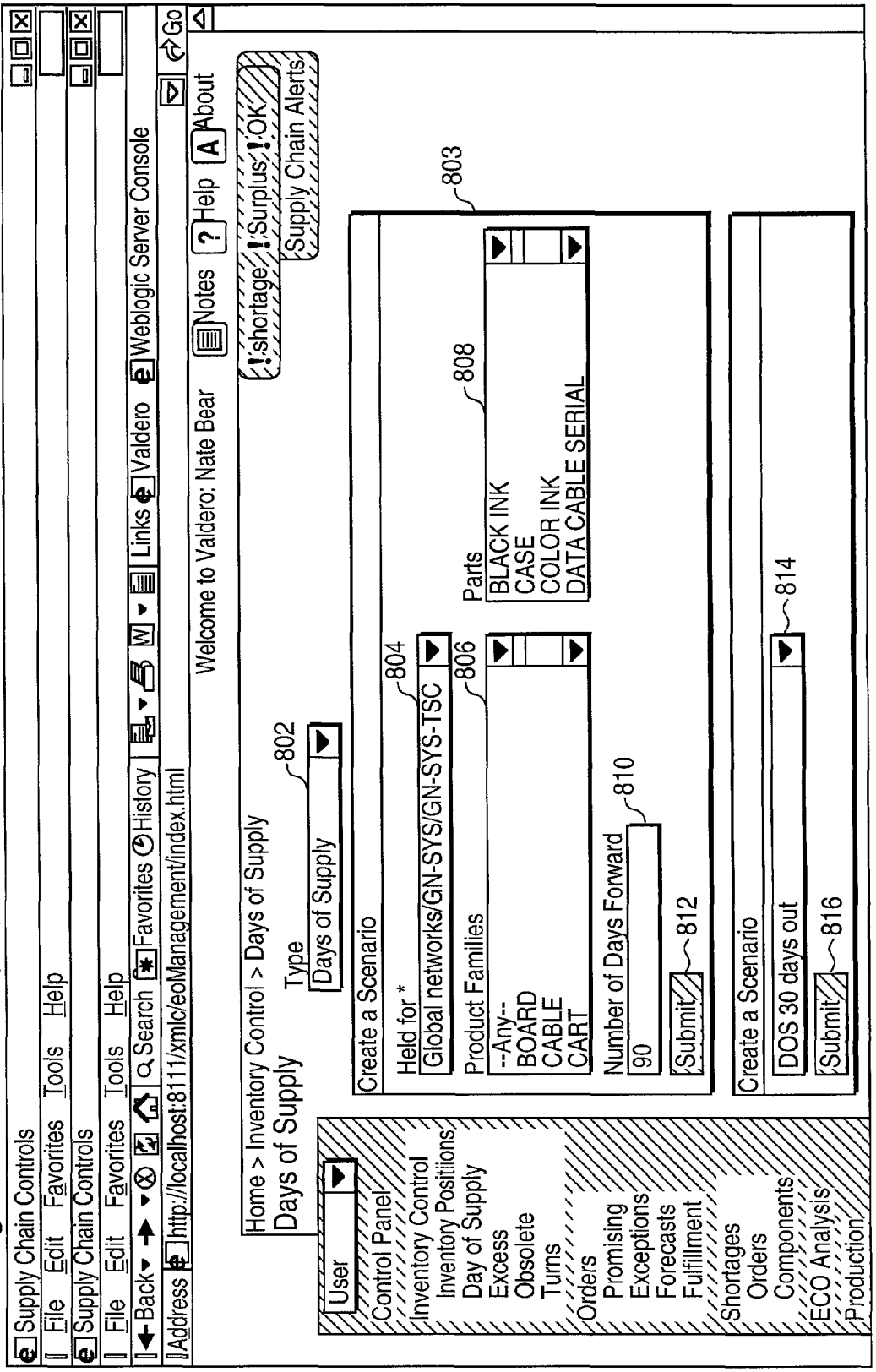
FIG. 8 is an example of a scenario interface according to the invention.
Figure 9:
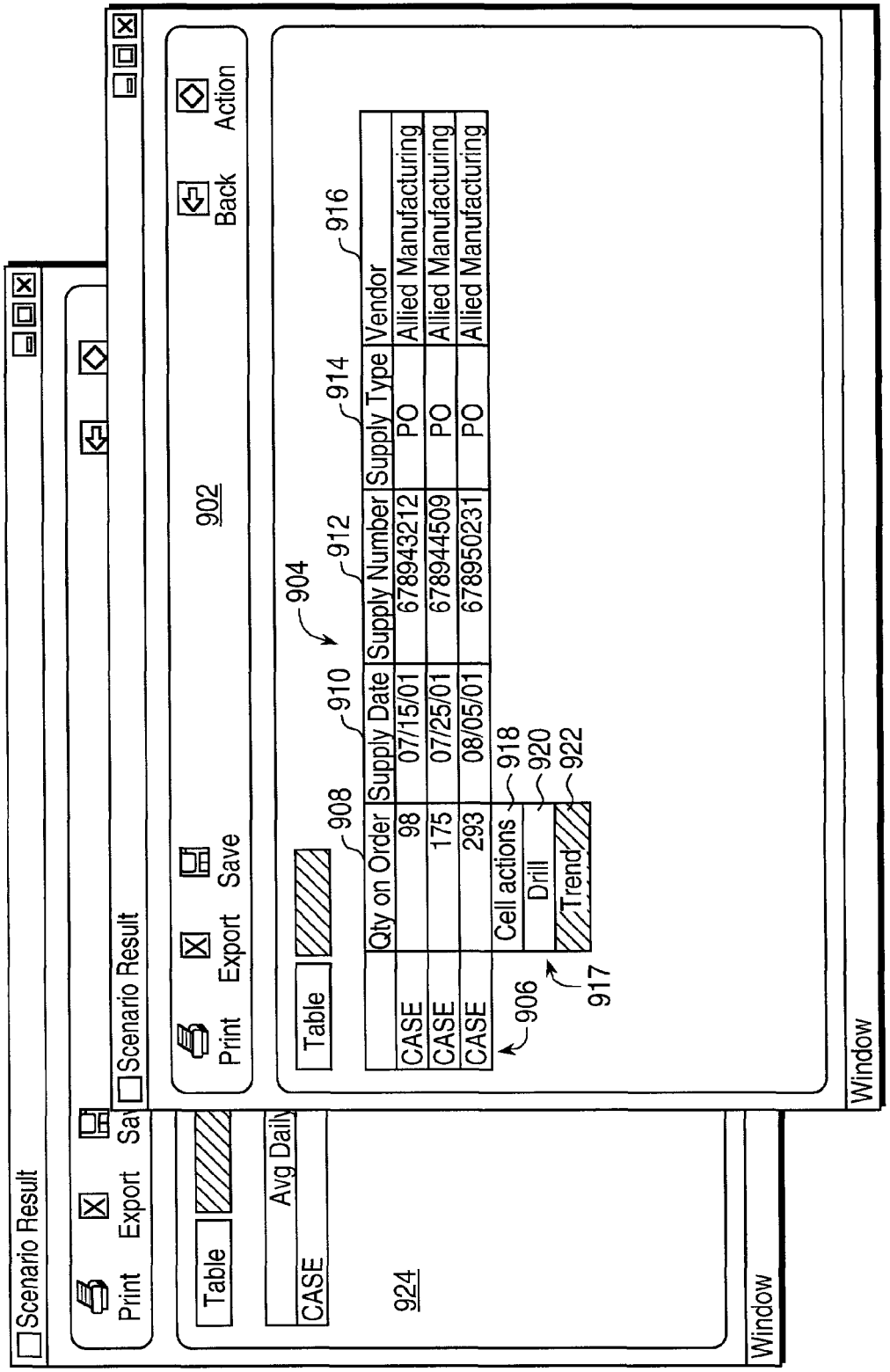
FIG. 9 is an example of a scenario interface according to the invention.

Referring to FIGS. 8-10, an example of a scenario set up is illustrated in the form of a component manufacturer (CM) supply chain management application. According to the invention, scenarios are generally built upon indicators, and bring indicators together for use in supply chain analysis. In the illustrated embodiment, the application is a web based application, where data is input by a user accessing the CM Management Scenario website 800. Once into the website, a scenario of days of supply can be created. The scenario type can be chosen in widow 802, such as days of supply. If it were desired to create a scenario, its parameters may be chosen in window 803. The user or entity for which the scenario is held for may be indicated n window 804. The product family may be chosen in window 806, and the part in window 808. If a scenario is to be in effect for a period of time, its duration going forward from creation may be designated in window 810. The completed form is then submitted with submit button 812. There may be pre-existing scenarios in the application, whereby they may be chosen in window 814. Window 814 may be a pull-down window for choosing from a number of scenarios, then submitting the chosen scenario with submit button 816. Referring to FIG. 9, results 900 of a scenario is illustrated. The scenario result page 902 may include a table 904 for a CASE part indicated in table rows 906. The table includes columns illustrating the various indicators related to the CASE including quantity on order 908, supply date 910, supply number 912, supply type 914, and supplying vendor 916. In any one of the rows, a pull down menu 917 may be drawn down, allowing a user to perform certain operations on a column, such as performing actions on a cell 918, drilling down for further information 920 and generating trends 922. The scenario results may be separately analyzed for other features, such as for average daily demand 924. Referring to FIG. 10, an illustration of a manifestation of an alert 1000 is illustrated. An alert may be manifested as an email 1002 to an interested party or entity. An alert report may also include further details that may occur on a website or other alert source. Details may include details such as the name of an alert 1004, a description of the alert 1006, the type of alert 1008, the data or time in which the alert was detected 1010, or other criteria of the alert 1012. Many scenarios may be generated using various indicators as building blocks. According to the invention, such scenarios are manifested as scenario instances 530 (FIG. 5) among other application instances 526.

In general, the invention may include the utilization of dedicated processors, webservers configured to receive and route browser requests, application servers, state servers and other types of computer processors configured to communicate amongst each other and that may be connected to one or more networks, including a Local Area Network (LAN), an intranet and the Internet. Equivalent structures embodying the invention could be configured for such applications without diverting from the spirit and scope of the invention. The invention may also utilize personal computers, application servers, state servers or Internet webservers that are designed and implemented on a computer and may be connected to a network for communication with other computers to practice the invention.

The invention may also involve a number of functions to be performed by a computer processor, such as a microprocessor. The microprocessor may be a specialized or dedicated microprocessor that is configured to perform particular tasks by executing machine-readable software code that defines the particular tasks. When descriptions in the application refer to particular code, such as infrastructure code 548 for example, it refers to the functions that the server or an application base processor or similar device perform when executing such code. The microprocessor may also be configured to operate and communicate with other devices such as direct storage access modules, memory and storage devices, Internet related hardware, and other devices that relate to the transmission of data in accordance with the invention. The software code may be configured using software formats such as Java, C++, XML (Extensible Mark-up Language) and other languages that may be used to define functions that relate to operations of devices required to carry out the functional operations related to the invention. The code may be written in different forms and styles, many of which are known to those skilled in the art. Different code formats, code configurations, styles and forms of software programs and other means of configuring code to define the operations of a microprocessor in accordance with the invention will not depart from the spirit and scope of the invention, which is defined by the appended claims.

Within the different types of computers, such as computer servers, that utilize the invention, there exist different types of storage devices for storing and retrieving information while performing functions according to the invention. Cache storage devices such as RAM are often included in such computers for use by the central processing unit as a convenient storage location for information that is frequently stored and retrieved. Similarly, a persistent storage is also frequently used with such computers for maintaining information that is frequently retrieved by a central processing unit, but that is not often altered within the persistent storage, unlike the cache storage. Main storage is also usually included for storing and retrieving larger amounts of information such as data and software applications configured to perform functions according to the invention when executed by the central processing unit. These memory or storage devices may be configured as random access memory (RAM), static random access memory (SRAM), dynamic random access memory (DRAM), flash memory, and other memory storage devices that may be accessed by a central processing unit to store and retrieve information. The invention is not limited to any particular type of memory or storage device, or to any commonly used protocol for storing and retrieving information to and from these devices respectively.

The invention is intended as and intelligent supply chain control system for use in a network system. Although this embodiment is described and illustrated in the context of a product development environment, the scope of the invention extends to other applications where convenient and intelligent access to information is required. Furthermore, while the foregoing description has been with reference to particular embodiments of the invention, it will be appreciated that these are only illustrative of the invention and the changes may be made to those embodiments without departing from the principles of invention, the scope of which is defined by the appended claims.

The invention claimed is:

1. A system for managing supply chain information generated by a business software application, comprising:
   a) a repository configured to store application instance type information in the form of objects and associated metadata that corresponds to instances associated with the business software applications, said application instance type information including alert type code configured to produce an alert instance defined by application alert parameters;
   b) a central processing unit (CPU) configured to control access to the repository by multiple users; and
   c) supply chain management code stored in memory and configured to allow access to type codes contained in the repository when executed by the CPU, the supply chain management code including:
      i) Software configured to instantiate objects in applications in a type-object platform where instances are decoupled from their associated classes, so that the associated classes can be implemented as instances of a class and allowing instances to be divided into two primary classes, one class in which the instances represent the actual instances of an application, and another class that represents the type of application instance, the instances being generated at run time, without recompilation, to dynamically monitor and analyze information related to a supply chain, said software further including rulebase type code configured to monitor the execution of supply chain plans according to original user entered parameters and to provide recommendations for making changes to such supply chain plans during a process of executing such supply chain plans thereby establishing altered supply chain plans according to predetermined functions that are monitored and executed in place of said supply chain plans, the rulebase type code being configured to produce an application specific rulebase instance defined by application related rules and parameters, such that the rulebase code is configured to cause application related functions to be performed according to rulebase rules and parameters when executed;
      ii) an analysis server configured to analyze supply chain information originating in and collected from the business software application,
      iii) an infrastructure server configured to provide application instances to the business software application, and
      iv) an event server configured to perform predetermined functions generated at run time in response to events related to the business software application, said event server further configured such that an alert code causes alert functions to be performed according to events related to the application alert parameters.

2. A system according to claim 1, wherein the rulebase code is configured to monitor the execution of supply chain plans to identify deviations from the supply chain plans and to aid in correcting the deviations through corrective feedback during the process of executing.

3. A system according to claim 2, wherein the rulebase code is further configured to provide corrective feedback regarding shortages occurring in the supply chain during the process of executing.

4. A system according to claim 2, wherein the rulebase code is further configured to provide corrective feedback regarding excess supply occurring in the supply chain during the process of executing.

5. A system according to claim 2, wherein the rulebase code is further configured to provide corrective feedback regarding supply chain deviancies occurring in the supply chain during the process of executing.

6. A system according to claim 2, wherein the rulebase code is further configured to provide corrective feedback regarding supply chain deviancies occurring in the supply chain during the process of executing to create a closed loop process.

7. A device to access and integrate chain information from a plurality of disparate business software applications, comprising:
   a) a repository configured to store application instance type information in the form of objects and associated metadata that corresponds to instances associated with the business software applications, said application instance type information including alert type code configured to produce an alert instance defined by application alert parameters;

b) a central processing unite (CPU) configured to control access to the repository by multiple users; and c) supply chain management code stored in memory and configured to allow access to type codes contained in the repository when executed by the CPU, the supply chain management code including:

i) software configured to instantiate objects in applications in a type-object platform where instances are decoupled from their associated classes, so that the associated classes can be implemented as instances of a class and allowing instances to be divided into two primary classes, one class in which the instances represent the actual instances of an application, and another class that represents the type of application instance, the instances being generated at run time, without recompilation, to dynamically monitor and analyze information related to a supply chain, said software further including rulebase type code configured to monitor the execution of supply chain plans and to provide corrective feedback during a process of executing such supply chain plans, said corrective feedback being utilized to create altered supply chain plans according to predetermined functions that are monitored and executed in place of said supply chain commands, the rulebase type code further configured to produce an application specific rulebase instance defined by application related rules and parameters, such that the rulebase code is configured to cause application related functions to be performed according to rulebase rules and parameters when executed;

ii) an analysis server configured to analyze supply chain information originating in and collected from the business software application, iii) an infrastructure server configured to provide application instances to the business software application, and iv) an event server configured to perform predetermined functions generated at run time in response to events related to the business software application, said event server further configured such that an alert code causes alert functions to be performed according to events related to the application alert parameters.

8. A method of providing access to supply chain information comprising:

receiving supply chain information originating from a plurality of multiple diverse business software applications;

instantiating objects in applications in a type-object platform where instances are decoupled from their associated classes, implementing associated classes as instances of a class and allowing instances to be divided into two primary classes, one class in which the instances represent the actual instances of an application, and another class representing the type of application instance, the instances being generated at run time, without recompilation, and dynamically monitoring and analyzing the information related to a supply chain, producing an application specific rulebase instance defined by application related rules and parameters, and performing application related functions to be performed according to rulebase rules and parameters;

providing application instances to the business software application, and performing predetermined functions generated at run time in response to events related to the business software application, including a) analyzing the supply chain information originating from the business application by executing predetermined analysis algorithms stored in a repository, and b) causing alert functions to be performed according to events related to the application alert parameters;

c) producing an application specific rulebase instance defined by application related rules and parameters, such that the rulebase code causes application related functions to be performed according to rulebase rules and parameters when executed; the rulebase code being configured to monitor the execution of supply chain plans and to provide corrective feedback in the form of predetermined functions during the process of executing such supply chain plans, said corrective feedback being utilized to create modified supply chain plans that are monitored and executed in place of said supply chain commands; and d) providing application instances to a business software application in execution of the supply chain management code, to provide indicators for observation and dissemination by a user in a type-object platform.

* * * * *